(12) United States Patent
Mizuno et al.

(10) Patent No.: US 12,344,134 B2
(45) Date of Patent: Jul. 1, 2025

(54) SEAT ROTATING DEVICE

(71) Applicant: TOYOTA BOSHOKU KABUSHIKI KAISHA, Aichi-ken (JP)

(72) Inventors: Takuya Mizuno, Aichi-ken (JP); Sadao Ito, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 208 days.

(21) Appl. No.: 18/201,902

(22) Filed: May 25, 2023

(65) Prior Publication Data

US 2023/0415618 A1    Dec. 28, 2023

(30) Foreign Application Priority Data

Jun. 22, 2022  (JP) ................. 2022-100145

(51) Int. Cl.
  *B60N 2/14* (2006.01)
  *B60N 2/07* (2006.01)
(52) U.S. Cl.
  CPC ................... *B60N 2/14* (2013.01); *B60N 2/07* (2013.01)
(58) Field of Classification Search
  CPC ... B60N 2/14; B60N 2/07; B60N 2/06; B60N 2/0224
  See application file for complete search history.

(56) References Cited

U.S. PATENT DOCUMENTS 10,336,216 B2 * 7/2019 Slungare ................ B60N 2/245
10,640,017 B2 * 5/2020 Murakami ........... B60N 2/0705

FOREIGN PATENT DOCUMENTS

JP         2022-78502 A    5/2022

* cited by examiner

*Primary Examiner* — Milton Nelson, Jr.
(74) *Attorney, Agent, or Firm* — Greenblum & Bernstein, P.L.C.

(57) ABSTRACT

A seat rotating device capable of achieving both of suppression of floating of a rotating plate from a seat slider and positioning in a front-rear direction of the rotating plate at a seating position is provided. The seat rotating device includes a seat slider including a lower rail and an upper rail, a base plate, a rotating plate including a belt anchor bracket, a coupling unit, a restriction portion, a fixing member, and a load bearing portion. The restriction portion includes an opposed portion opposed, in the front-rear direction, to a rear end of the belt anchor bracket while the rotating plate is located at the seating position and a tab located above the rear end of the belt anchor bracket while the rotating plate is located at the seating position.

6 Claims, 17 Drawing Sheets

SEAT ROTATING DEVICE

CROSS REFERENCE TO RELATED APPLICATIONS

This nonprovisional application is based on Japanese Patent Application No. 2022-100145 filed with the Japan Patent Office on Jun. 22, 2022, the entire contents of which are hereby incorporated by reference.

BACKGROUND

Field

This invention relates to a seat rotating device.

Description of the Background Art

A seat rotating device capable of allowing a seat body to slide in a front-rear direction of a vehicle and rotating the seat body between a seating position and a getting-on and -off position has conventionally been known. For example, Japanese Patent Laying-Open No. 2022-78502 discloses a seat rotating device including a seat slider, a base plate, a rotating plate, and a coupling unit. The seat slider includes a lower rail fixed to a floor of the vehicle and an upper rail movable along the lower rail. The base plate is fixed to the upper rail. The rotating plate is fixed to a lower surface of the seat body. The coupling unit couples the base plate and the rotating plate to each other such that the rotating plate is rotatable with respect to the base plate between the seating position and the getting-on and -off position. At an end of the rotating plate on an inner side in a width direction of the vehicle, a belt anchor bracket for fixing an anchor of a seat belt is attached.

SUMMARY

In the seat rotating device described in Japanese Patent Laying-Open No. 2022-78502, there is a room for improvement in resistance against upward load inputted from the anchor of the seat belt. Specifically, the belt anchor bracket and the rotating plate desirably do not float from the upper rail of the seat slider at the time when upward load is applied to the anchor of the seat belt.

In such a seat rotating device, a position in the front-rear direction of the rotating plate that moves from the getting-on and -off position to the seating position is desirably appropriately determined.

An object of the present invention is to provide a seat rotating device capable of achieving both of suppression of floating of a rotating plate from a seat slider and positioning in a front-rear direction, of the rotating plate at a seating position.

A seat rotating device according to one aspect of this invention is a seat rotating device that moves a seat body in a front-rear direction of a vehicle and rotates the seat body between a seating position where the seat body faces front of the vehicle and a getting-on and -off position where the seat body faces an opening of a door of the vehicle. The seat rotating device includes a seat slider that allows movement of the seat body in the front-rear direction, the seat slider including a lower rail fixed on a floor side and an upper rail movable along the lower rail, a base plate fixed to the upper rail, a rotating plate fixed to a lower surface of the seat body so as not to rotate relatively to the seat body, the rotating plate including a belt anchor bracket to which an anchor of a seat belt is fixed, a coupling unit that couples the base plate and the rotating plate to each other such that the rotating plate is rotatable with respect to the base plate between the seating position and the getting-on and -off position, a restriction portion fixed to the upper rail, the restriction portion restricting upward movement of the belt anchor bracket while the rotating plate is located at the seating position, a fixing member fixed to the belt anchor bracket, and a load bearing portion fixed to the upper rail, the load bearing portion bearing upward load applied to the fixing member while the rotating plate is located at the seating position. The restriction portion includes an opposed portion opposed, in the front-rear direction, to a rear end of the belt anchor bracket while the rotating plate is located at the seating position and a tab contiguous to the opposed portion, the tab being located above the rear end of the belt anchor bracket while the rotating plate is located at the seating position.

The foregoing and other objects, characteristics, aspects, and advantages of the present invention will become more apparent from the following detailed description of the present invention when taken in conjunction with the accompanying drawings.

DESCRIPTION OF THE PREFERRED EMBODIMENTS

Figure 1:
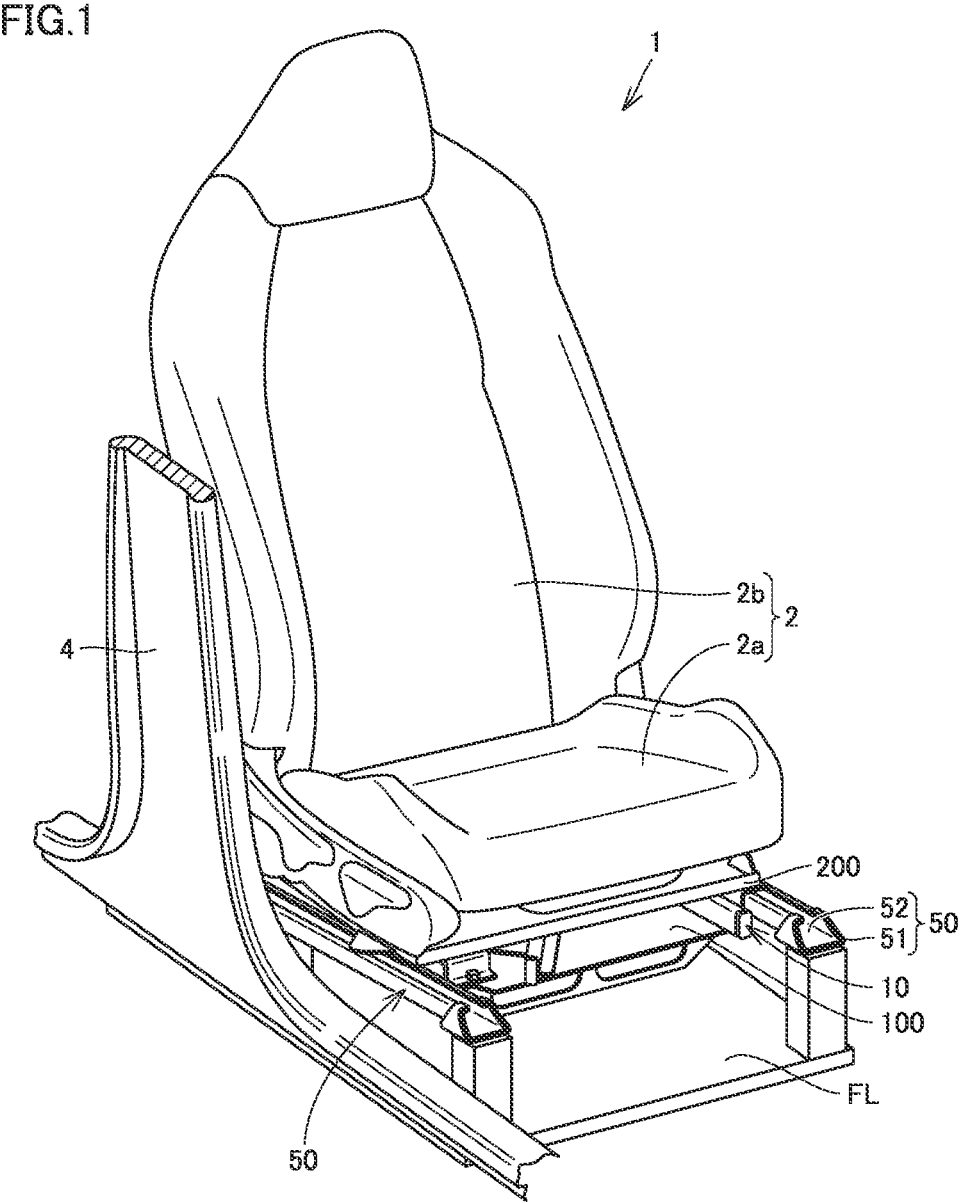
FIG. 1 is a perspective view of a rotary seat at a seating position.

An embodiment of the present invention will be described with reference to the drawings. In the drawings referred to below, the same or corresponding members have the same reference characters allotted.

First Embodiment

Figure 2:
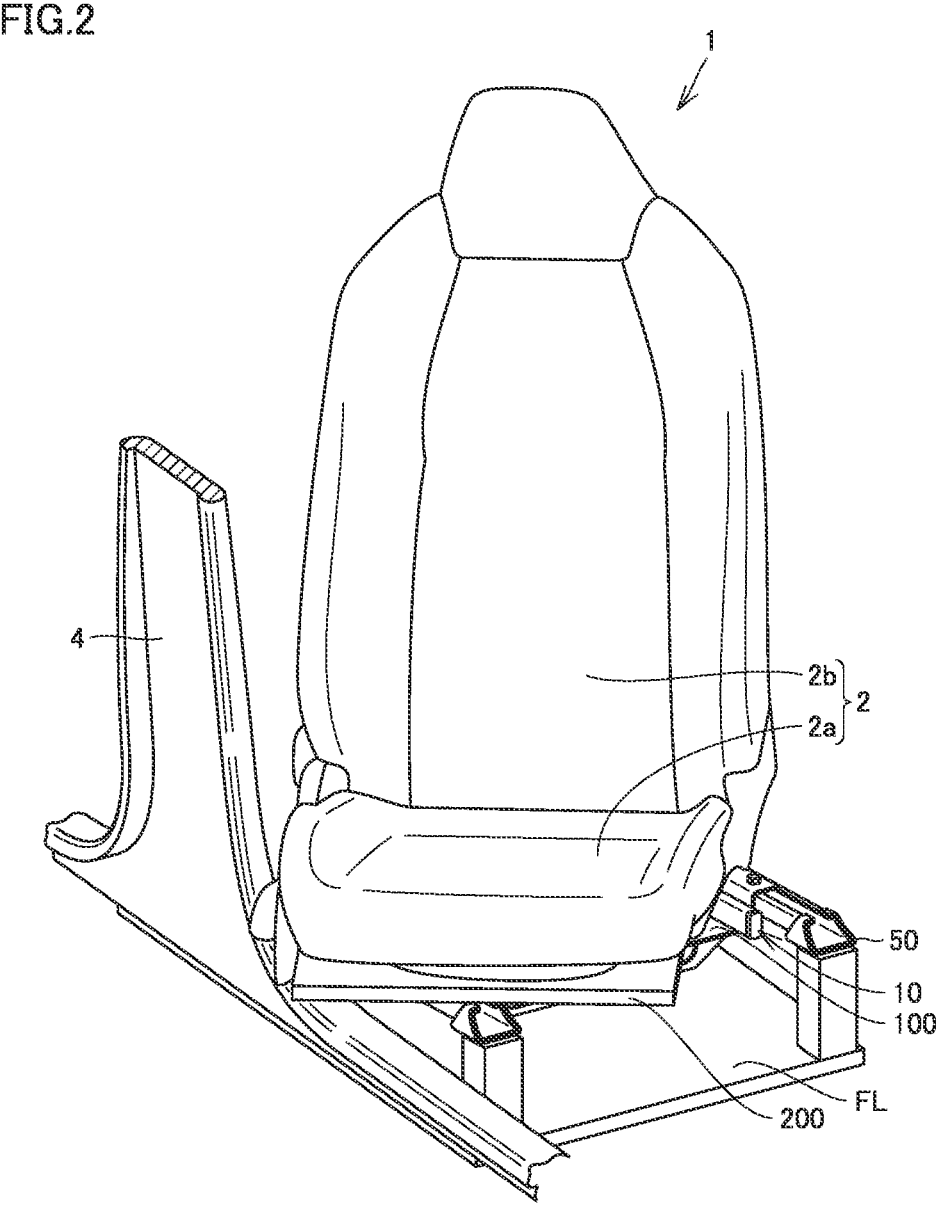
FIG. 2 is a perspective view of the rotary seat at a getting-on and -off position.

FIG. 1 is a perspective view of a rotary seat at a seating position. FIG. 2 is a perspective view of the rotary seat at a getting-on and -off position. This rotary seat 1 functions as a vehicle seat, in particular, as a car seat.

As shown in FIGS. 1 and 2, rotary seat 1 in the present embodiment includes a seat body 2 and a seat rotating device 10.

Seat body 2 includes a seat cushion 2a and a seat back 2b. Seat cushion 2a constitutes a seat. Seat back 2b supports the back of an occupant seated on seat cushion 2a. Seat body 2 is disposed on a floor FL of a vehicle.

Seat rotating device 10 can move seat body 2 in a front-rear direction of the vehicle and can rotate seat body 2 between the seating position (the position shown in FIG. 1) and the getting-on and -off position (the position shown in FIG. 2). The seating position refers to a position where seat body 2 faces the front of the vehicle. The getting-on and -off position refers to a position where seat body 2 faces an opening of a door of the vehicle. Seat rotating device 10 is fixed to the lower surface of seat body 2.

Figure 3:
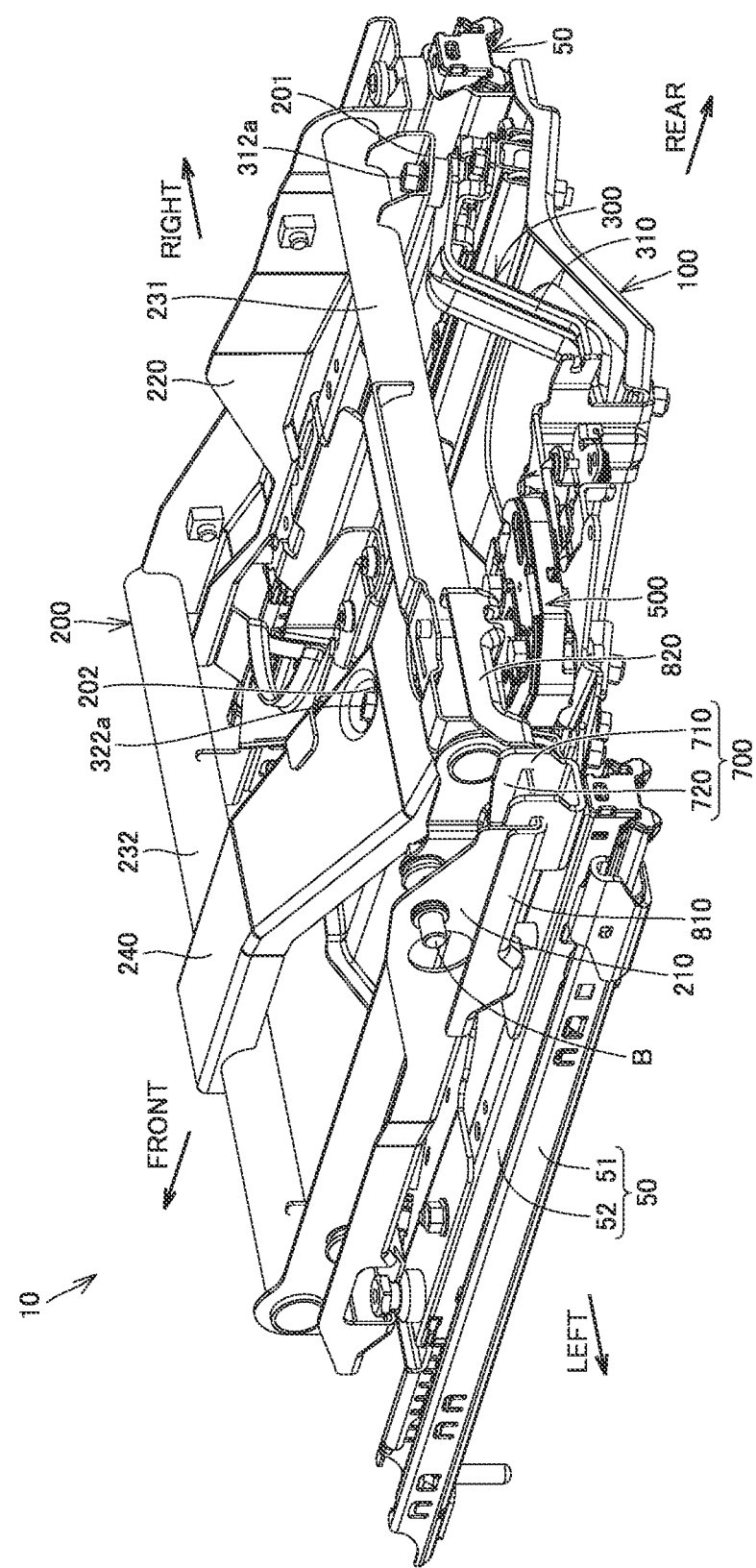
FIG. 3 is a perspective view of a seat rotating device at the seating position in a first embodiment of the present invention.
Figure 4:
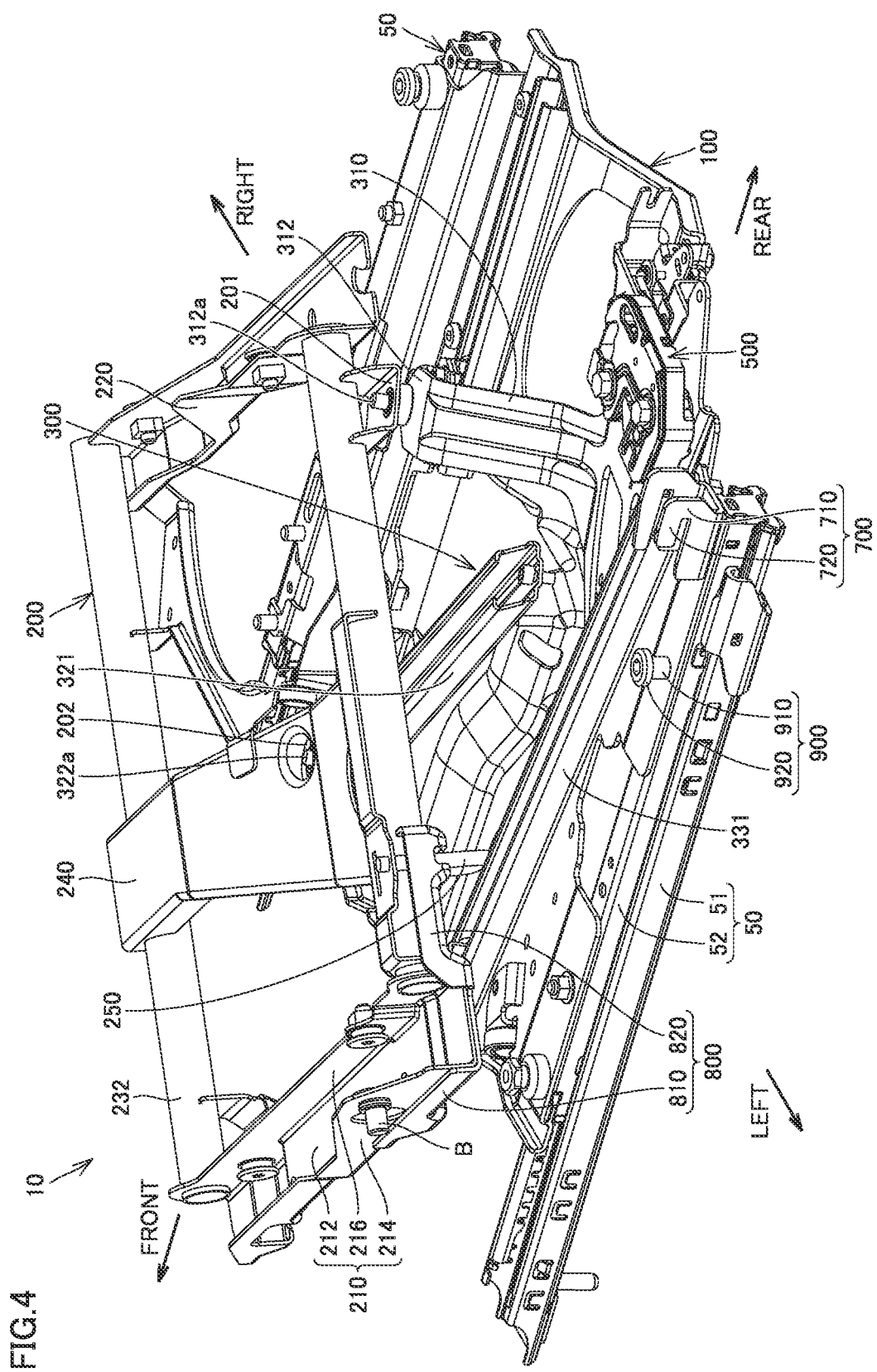
FIG. 4 is a perspective view of the seat rotating device at the getting-on and -off position.
Figure 5:
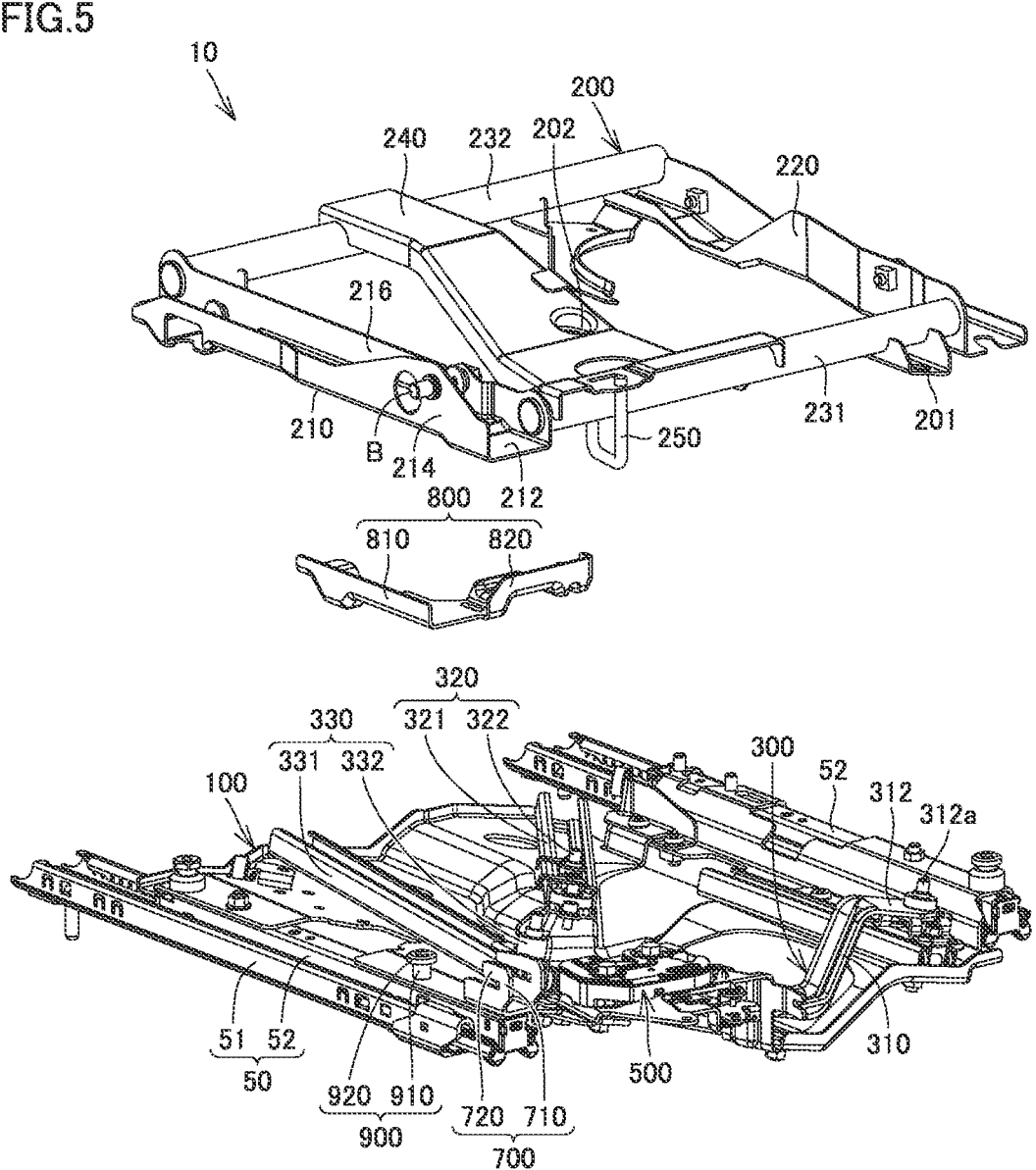
FIG. 5 is an exploded perspective view of the seat rotating device.

FIG. 3 is a perspective view of the seat rotating device at the seating position in a first embodiment of the present invention. FIG. 4 is a perspective view of the seat rotating device at the getting-on and -off position. FIG. 5 is an exploded perspective view of the seat rotating device.

As shown in FIGS. 3 to 5, seat rotating device 10 includes a seat slider, 50, a base plate 100, a rotating plate 200, a coupling unit 300, and a locking unit 500.

Seat slider 50 is fixed to floor FL. Seat slider 50 allows sliding with respect to floor FL, of seat body 2 in the front-rear direction of the vehicle. Seat slider 50 includes a pair of lower rails 51 and a pair of upper rails 52.

Lower rails 51 are arranged at a distance in a width direction of the vehicle. Each lower rail 51 is fixed to floor FL in a posture in parallel to the front-rear direction of the vehicle. Each lower rail 51 has a flat bottom surface.

Each upper rail 52 is displaceable relatively to lower rail 51 in the front-rear direction of the vehicle (a longitudinal direction of lower rail 51). Each upper rail 52 has a flat upper surface.

Base plate 100 is fixed to upper rail 52. Base plate 100 is movable together with upper rail 52 along lower rail 51.

Rotating plate 200 is fixed to the lower surface of seat body 2 so as not to rotate relatively to seat body 2. As shown in FIGS. 3 to 5, rotating plate 200 includes a belt anchor bracket 210, a side bracket 220, a rear pipe 231, a front pipe 232, a coupling plate 240, and a striker 250.

Belt anchor bracket 210 is a bracket to which an anchor (not shown) of a seat belt is fixed. Belt anchor bracket 210 is in a shape extending in the front-rear direction. Belt anchor bracket 210 is arranged above upper rail 52 arranged on an inner side (on the left in the present embodiment) in the width direction. Belt anchor bracket 210 includes a bottom wall 212, a first sidewall 214, and a second sidewall 216.

First sidewall 214 is erected from an end of bottom wall 212 distant from the opening of the door of the vehicle. A bolt B for fixing the anchor of the seat belt is fixed to first sidewall 214.

Second sidewall 216 is opposed to first sidewall 214 in the width direction. Second sidewall 216 is erected from an end of bottom wall 212 on a side closer to the opening of the door of the vehicle.

Side bracket 220 is arranged at a position opposed to belt anchor bracket 210 in the width direction. Side bracket 220 is arranged above upper rail 52 arranged on an outer side (on the right in the present embodiment) in the width direction. Side bracket 220 is in a shape extending in the front-rear direction.

Rear pipe 231 couples a rear portion of belt anchor bracket 210 and a rear portion of side bracket 220 to each other. More specifically, rear pipe 231 couples the rear portion of second sidewall 216 and the rear portion of side bracket 220 to each other.

Front pipe 232 couples a front portion of belt anchor bracket 210 and a front portion of side bracket 220 to each other. More specifically, rear pipe 231 couples the front portion of second sidewall 216 and the front portion of side bracket 220 to each other.

Coupling plate 240 couples rear pipe 231 and front pipe 232 to each other.

As shown in FIGS. 3 to 5, striker 250 is fixed to a rear end of coupling plate 240. Striker 250 is fixed to coupling plate 240 astride ends of rear pipe 231 on an inner side in the width direction.

Coupling unit 300 couples base plate 100 and rotating plate 200 to each other such that rotating plate 200 is rotatable with respect to base plate 100 between the seating position and the getting-on and -off position.

Coupling unit 300 includes a rotation link 310, a main slider 320, and a sub slider 330.

Rotation link 310 couples base plate 100 and rotating plate 200 to each other. Rotation link 310 includes a fixing end 311 (see FIG. 6) and a rotating end 312.

Fixing end 311 is formed from one end of rotation link 310. Fixing end 311 is fixed to base plate 100 as being rotatable relatively to base plate 100. Specifically, fixing end 311 is fixed by a fastening member from a rear side of base plate 100. Fixing end 311 is rotatable around a fixing shaft portion 311a (see FIG. 6) which is a central shaft of the fastening member.

Rotating end 312 is formed from the other end of rotation link 310. Rotating end 312 is fixed to rotating plate 200 as being pivotable with respect to base plate 100 around fixing shaft portion 311a of fixing end 311 and being rotatable relatively to rotating plate 200. Specifically, rotating end 312 is fixed to rotating plate 200 by a fastening member. Rotating plate 200 is rotatable relatively to rotating end 312 around a support shaft portion 312a which is a central shaft of the fastening member. A part of rotating plate 200 supported by support shaft portion 312a is denoted as a "first supported portion 201" (see FIGS. 3 to 5) below.

Main slider 320 includes a lower rail 321 and an upper slider 322.

Lower rail 321 is fixed to base plate 100. Specifically, lower rail 321 is fixed to a central portion of base plate 100. Lower rail 321 is in a linearly extending shape. Lower rail 321 is in a shape linearly extending along a diameter of a virtual circle A1 (see FIG. 6) having a length twice as long as a distance between fixing shaft portion 311a at fixing end 311 and support shaft portion 312a at rotating end 312 as a radius and having fixing shaft portion 311a as the center.

Figure 6:
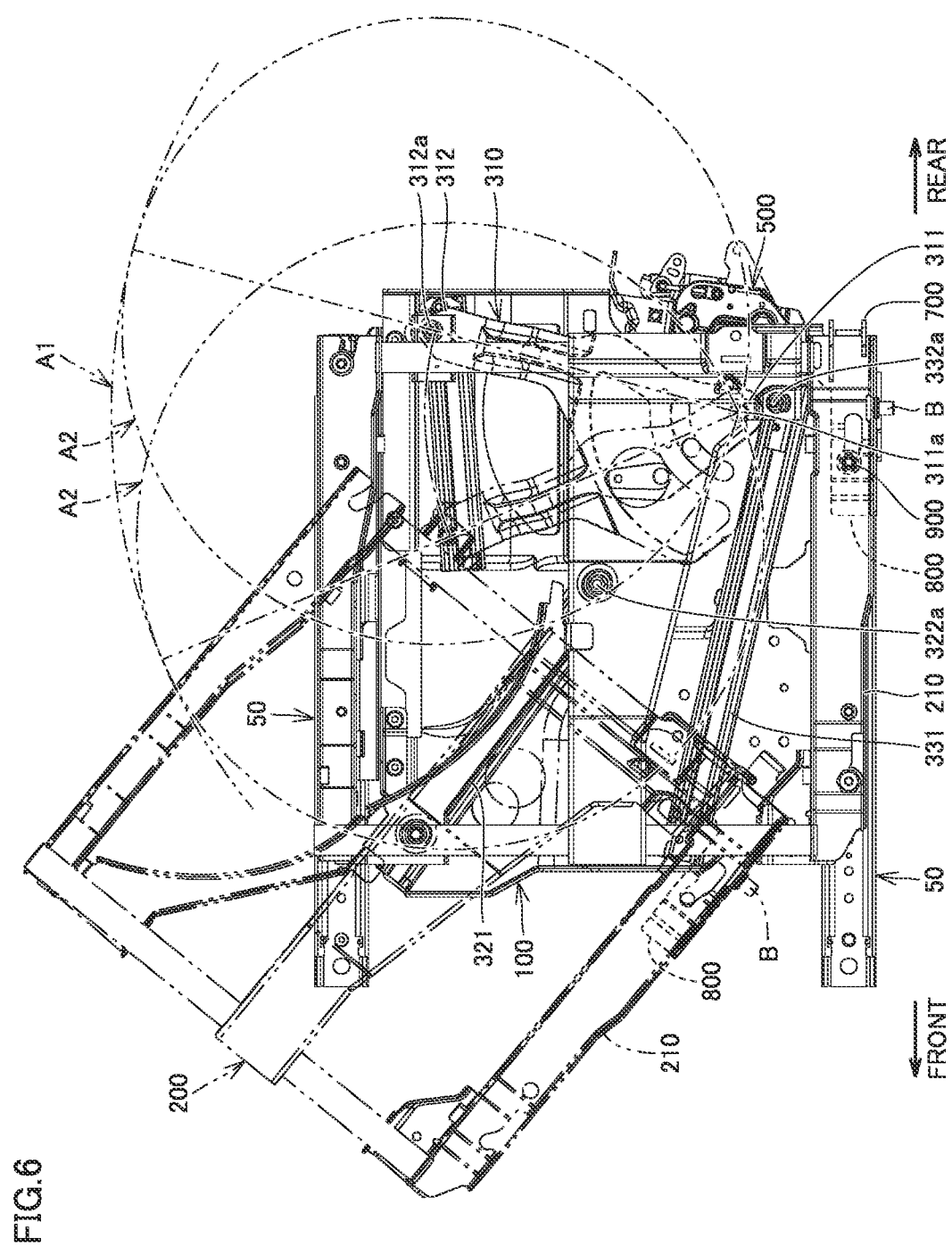
FIG. 6 is a diagram showing positional relation among a base plate, a rotating plate, and a coupling unit at the seating position and the getting-on and -off position.

FIG. 6 shows with a chain dotted line, virtual circle A1 and a circle A2 having a length between fixing shaft portion 311a and support shaft portion 312a as a radius and having support shaft portion 312a as the center, and shows rotating plate 200 with a chain double-dotted line. An entrance/exit of the vehicle is provided in an upper portion in FIG. 6.

As shown in FIG. 6, lower rail 321 is in a shape linearly extending in a direction intersecting with the front-rear direction of the vehicle and along the diameter of virtual circle A1. Lower rail 321 is inclined with respect to the front-rear direction as gradually coming closer to the opening of the door, in a direction toward the front of the vehicle.

Upper slider 322 is movable along lower rail 321. Upper slider 322 supports rotating plate 200 such that rotating plate 200 is rotatable relatively to upper slider 322. Specifically, upper slider 322 is fixed to rotating plate 200 by a fastening member. Rotating plate 200 is rotatable relatively to upper slider 322 around a support shaft portion 322a which is a central shaft of the fastening member. A part of rotating plate 200 supported by support shaft portion 322a is denoted as a "second supported portion 202" (see FIGS. 3 to 5) below.

Upper slider 322 allows movement of second supported portion 202 of rotating plate 200 along lower rail 321 while it allows rotation of second supported portion 202 relatively to upper slider 322 in the direction the same as a direction of rotation (clockwise in FIG. 6) of rotating plate 200 with respect to rotating end 312 when rotating plate 200 moves from the seating position to the getting-on and -off position.

Support shaft portion 322a of upper slider 322 moves along a locus (the diameter of virtual circle A1) of a point on circle A2 at the time of rotation of circle A2 as being inscribed in virtual circle A1 when seat body 2 moves between the seating position and the getting-on and -off position.

Sub slider 330 includes a lower rail 331 and an upper slider 332.

Lower rail 331 is fixed to base plate 100. Specifically, lower rail 331 is fixed to a part of base plate 100 located between seat slider 50 arranged on the inner side in the width direction and lower rail 321 of main slider 320. Lower rail 331 has a linearly extending shape. As shown in FIG. 6, lower rail 331 is fixed to base plate 100 in such a posture that an extension of lower rail 331 does not pass through fixing shaft portion 311a which is the center of virtual circle A1. Lower rail 331 is inclined with respect to the front-rear direction as gradually coming closer to the opening of the door, in the direction toward the front of the vehicle.

Upper slider 332 is movable along lower rail 331. Upper slider 332 supports rotating plate 200 such that rotating plate 200 is rotatable relatively to upper slider 332. Specifically, upper slider 332 is fixed to rotating plate 200 by a fastening member. Rotating plate 200 is rotatable relatively to upper slider 332 around a support shaft portion 332a which is a central shaft of the fastening member. A part of rotating plate 200 supported by support shaft portion 332a is denoted as a "third supported portion" below.

Upper slider 322 allows movement of the third supported portion of rotating plate 200 along lower rail 331 while it allows rotation of the third supported portion relatively to upper slider 332 in a direction the same as the direction (clockwise in FIG. 6) of rotation of rotating plate 200 with respect to rotating end 312 when rotating plate 200 moves from the seating position to the getting-on and -off position.

Though not shown, seat rotating device 10 may include a drive unit that drives coupling unit 300. For example, the drive unit is composed of a motor, a gear, and the like that can rotate rotation link 310 around fixing end 311. When the motor is driven while rotating plate 200 is located at the seating position, rotation link 310 rotates around fixing end 311 and upper sliders 322 and 332 move forward along respective lower rails 321 and 331. Rotating plate 200 thus rotates toward the entrance/exit while it moves forward with respect to base plate 100. Consequently, rotating plate 200 is located at the getting-on and -off position.

Locking unit 500 locks rotating plate 200 at the seating position. Locking unit 500 is fixed to base plate 100 by a fastening member. Locking unit 500 can lock striker 250 in rotating plate 200 located at the seating position.

Figure 10:
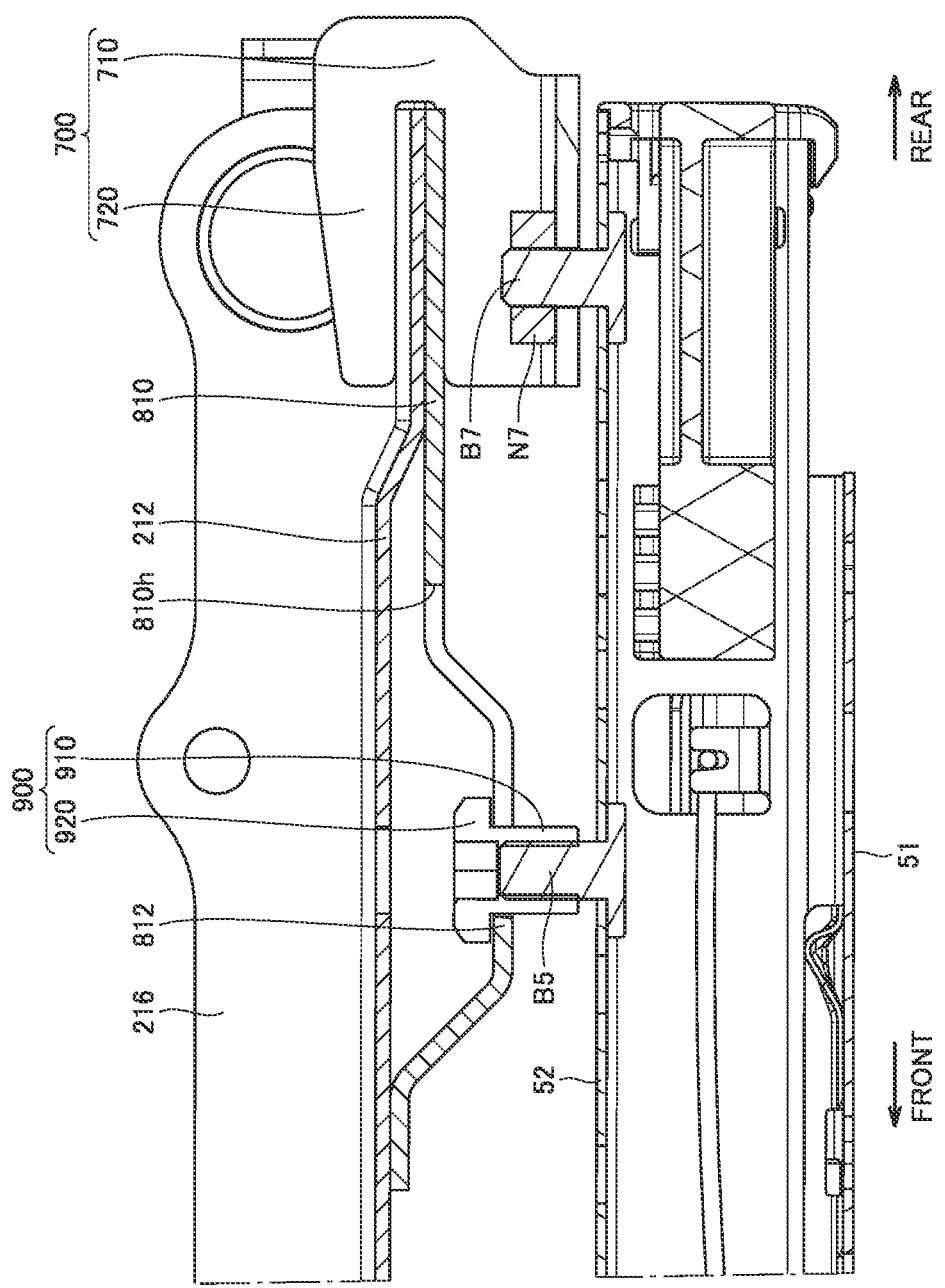
FIG. 10 is a cross-sectional view along the line X-X in FIG. 9.
Figure 11:
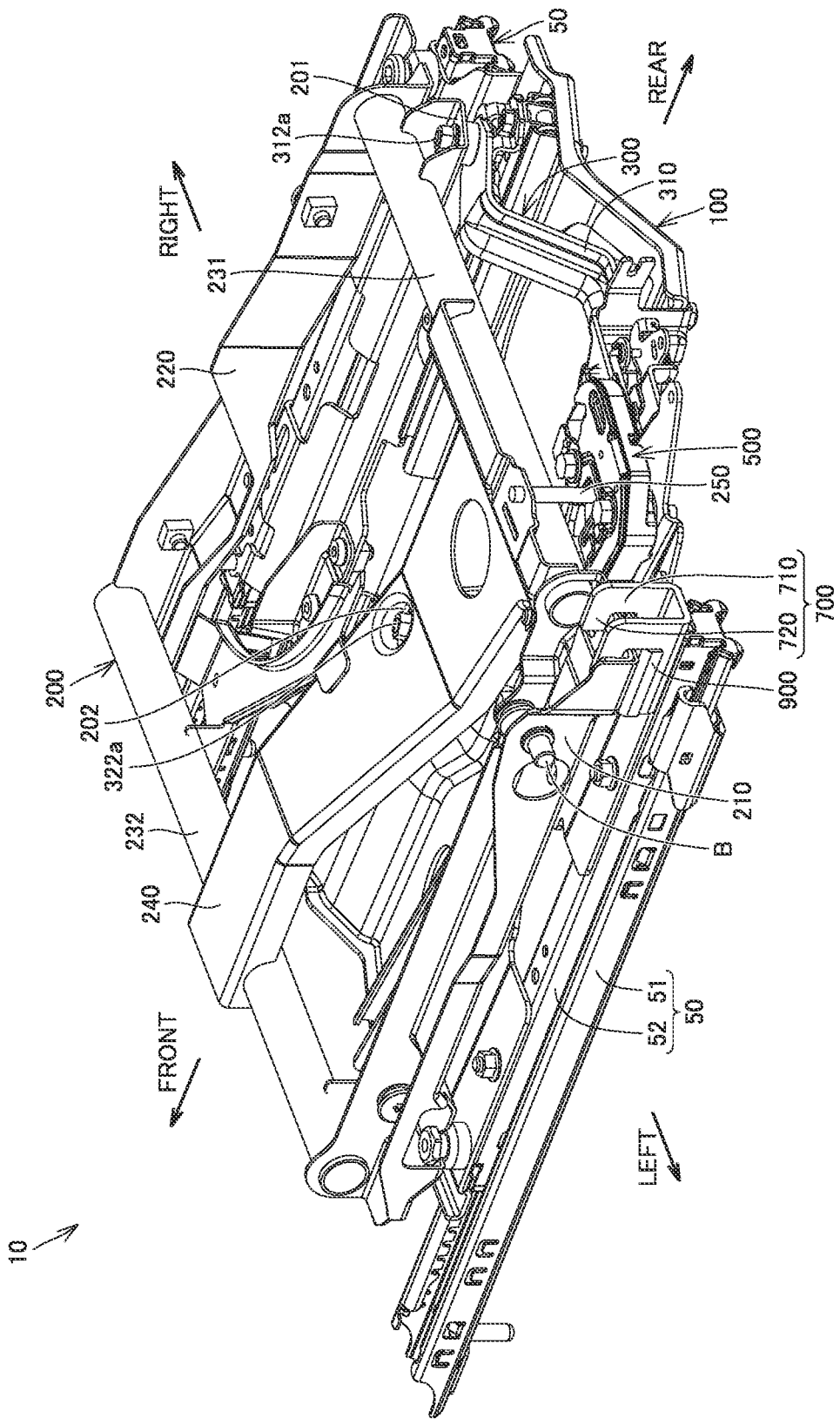
FIG. 11 is a perspective view of the seat rotating device at the seating position in a second embodiment of the present invention.
Figure 12:
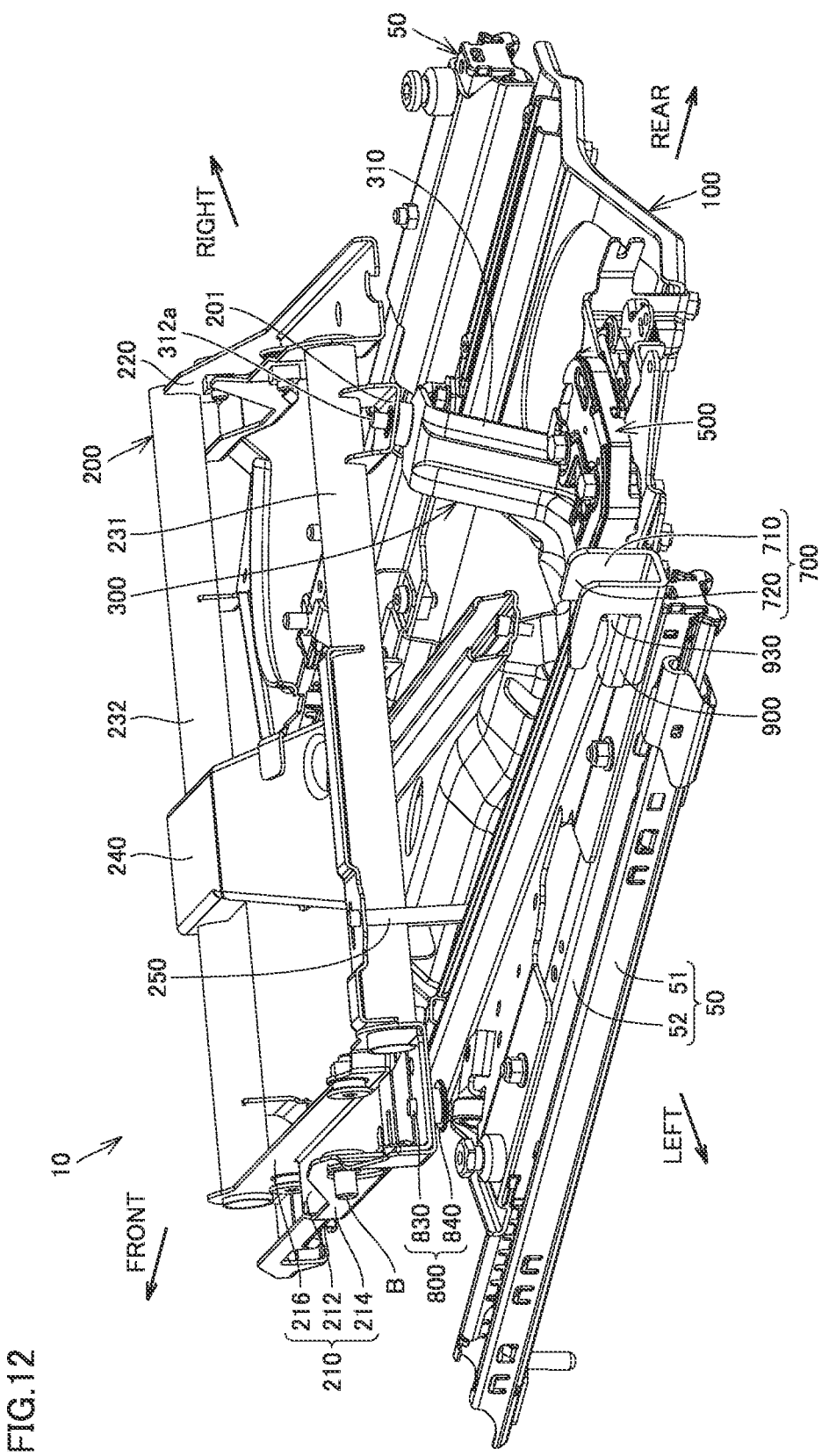
FIG. 12 is a perspective view of the seat rotating device at the getting-on and -off position.
Figure 13:
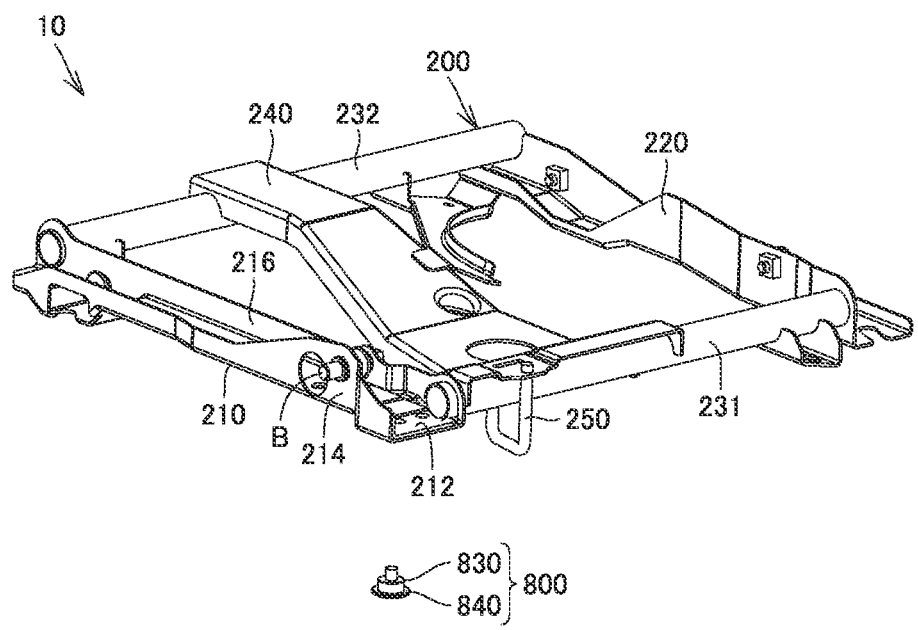
FIG. 13 is an exploded perspective view of the seat rotating device.
Figure 13:
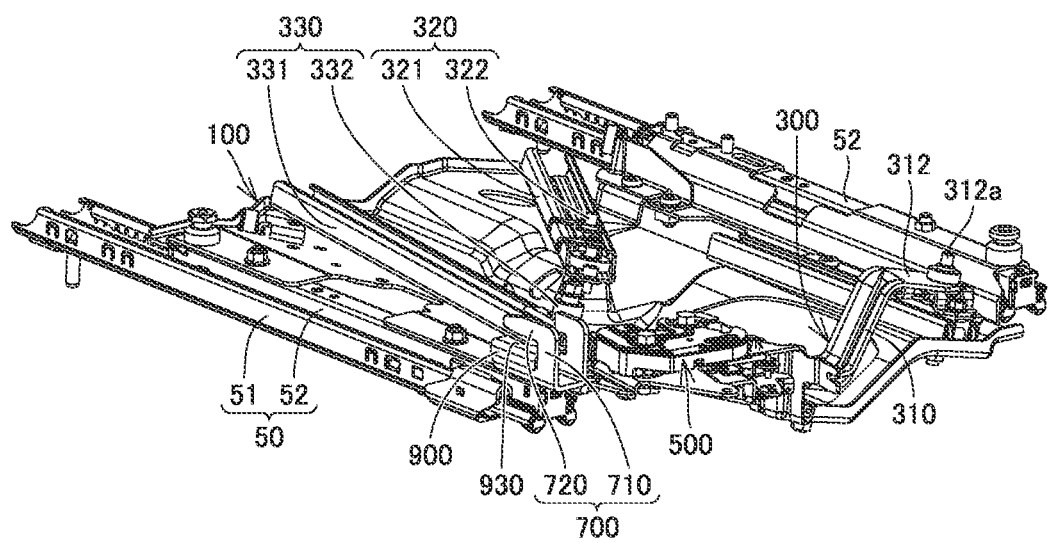

Restriction portion 700 restricts upward movement of belt anchor bracket 210 while rotating plate 200 is located at the seating position. Restriction portion 700 is fixed to upper rail 52 of seat slider 50 arranged on the inner side (on the left in the present embodiment) in the width direction. As shown in FIG. 10, restriction portion 700 is fixed to upper rail 52 by a bolt B7 and a nut N7. Restriction portion 700 includes an opposed portion 710 and at least one tab 720.

Opposed portion 710 is opposed, in the front-rear direction, to the rear end of belt anchor bracket 210 while rotating plate 200 is located at the seating position. Specifically, opposed portion 710 is opposed, in the front-rear direction, to the rear end of bottom wall 212 while rotating plate 200 is located at the seating position. Opposed portion 710 may be in contact with or slightly distant from the rear end of bottom wall 212 while rotating plate 200 is located at the seating position.

At least one tab 720 includes a pair of tabs 720 arranged at a distance in the width direction. Each tab 720 is contiguous to an upper end of opposed portion 710. Each tab 720 is in a shape extending forward from the upper end of opposed portion 710. Each tab 720 is arranged between first sidewall 214 and second sidewall 216 while rotating plate 200 is located at the seating position. Each tab 720 is located above the rear end of belt anchor bracket 210 while rotating plate 200 is located at the seating position. Specifically, each tab 720 is located above the rear end of bottom wall 212 while rotating plate 200 is located at the seating position.

A fixing member 800 is fixed to belt anchor bracket 210. In the present embodiment, fixing member 800 is formed from a metal bracket. Fixing member 800 includes a base portion 810 and a pipe contact portion 820.

Base portion 810 is arranged below belt anchor bracket 210. Base portion 810 is fixed to a lower surface of bottom wall 212 by welding or the like.

Figure 7:
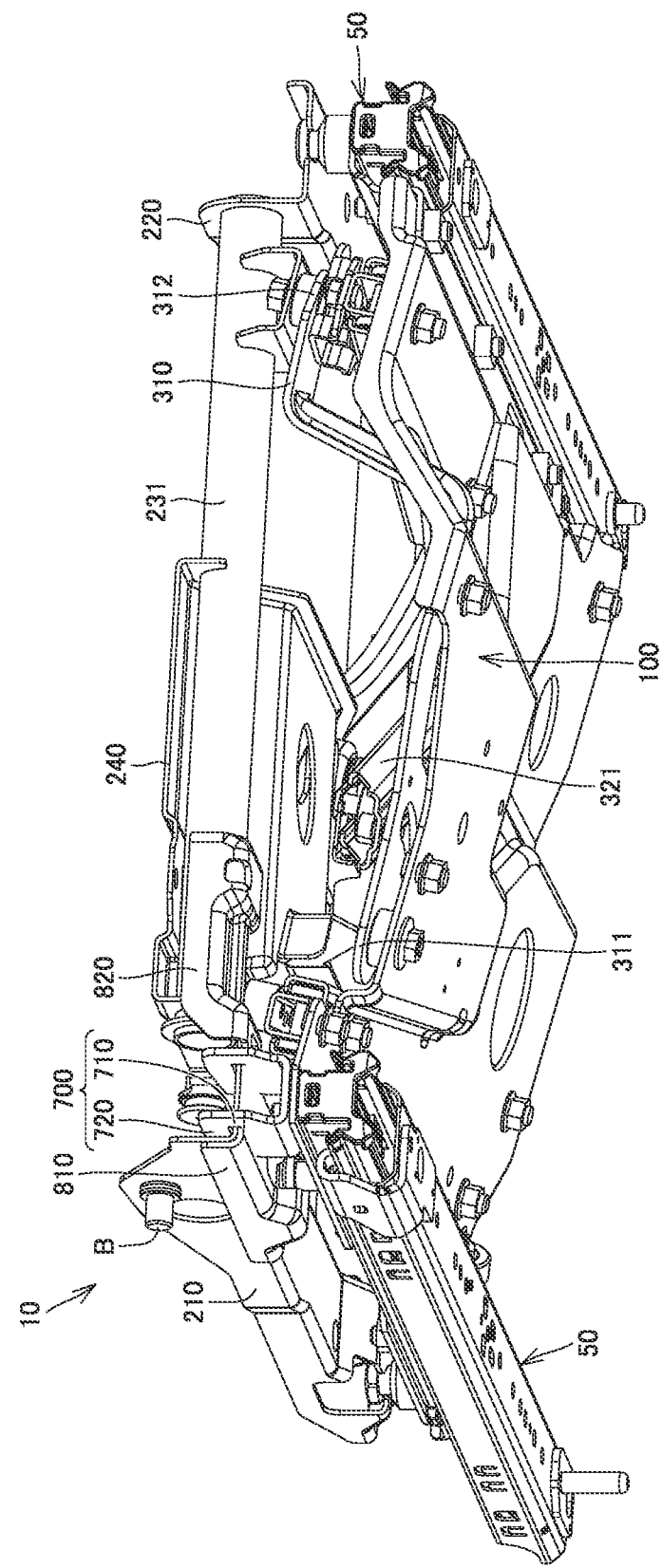
FIG. 7 is a perspective view of a state of the seat rotating device when viewed upward from below.

Pipe contact portion 820 is contiguous to base portion 810. Pipe contact portion 820 is in a shape extending from the rear end of base portion 810 in the width direction toward rear pipe 231. As shown in FIG. 7, pipe contact portion 820 is in contact with rear pipe 231 from below. Pipe contact portion 820 may be connected to rear pipe 231 by welding or the like. Pipe contact portion 820 is provided with an insertion hole for insertion of striker 250.

As shown in FIGS. 4 and 5, a load bearing portion 900 is fixed to upper rail 52 of seat slider 50 arranged on the inner side (on the left in the present embodiment) in the width direction. Load bearing portion 900 bears upward load applied to fixing member 800 while rotating plate 200 is located at the seating position. The upward load may be inputted from the anchor of the seat belt through belt anchor bracket 210 and bolt B. In the present embodiment, load bearing portion 900 includes a shaft portion 910 and a projecting portion 920.

Shaft portion 910 is in a shape extending upward from upper rail 52. As shown in FIG. 10, shaft portion 910 is screwed to a bolt B5 fixed to the upper surface of upper rail 52.

Projecting portion 920 is in a shape projecting from an upper end of shaft portion 910 in the direction orthogonal to shaft portion 910. Projecting portion 920 is formed in a shape of a disc annularly contiguous in a circumferential direction of shaft portion 910. Projecting portion 920 may be formed in a shape projecting only in one direction (for example, forward) from the upper end of shaft portion 910.

Figure 8:
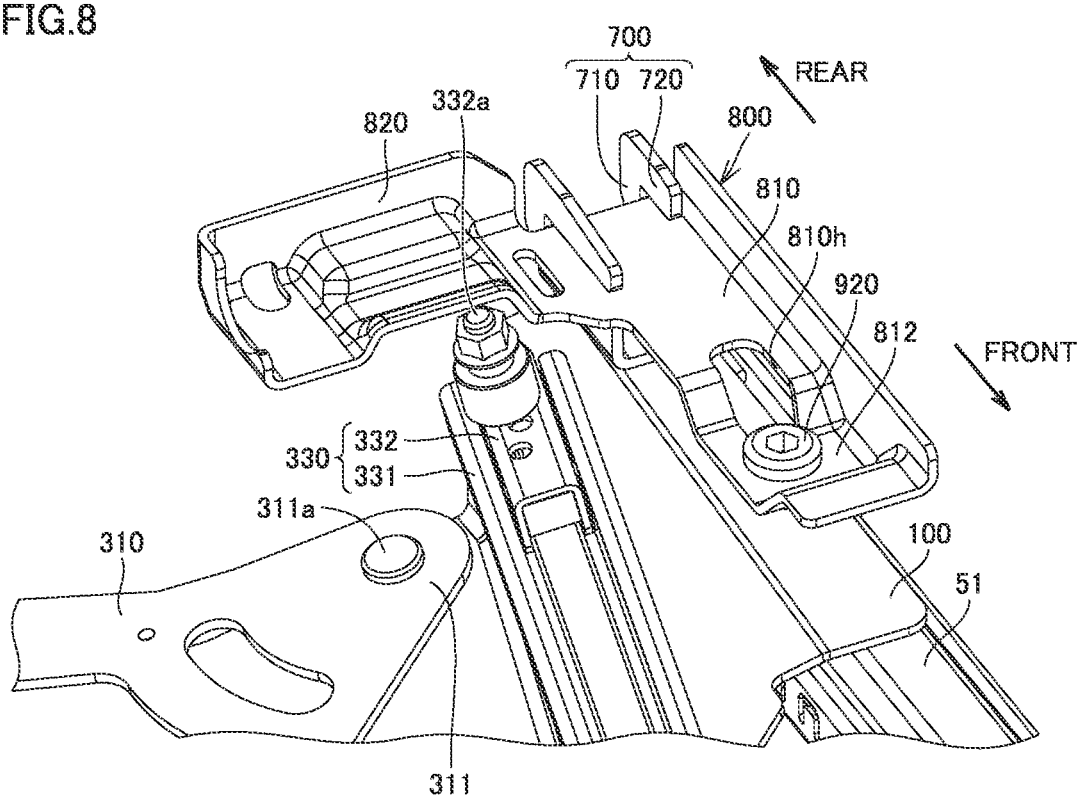
FIG. 8 is a perspective view of the vicinity of a restriction portion, a fixing member, and a load bearing portion.
Figure 9:
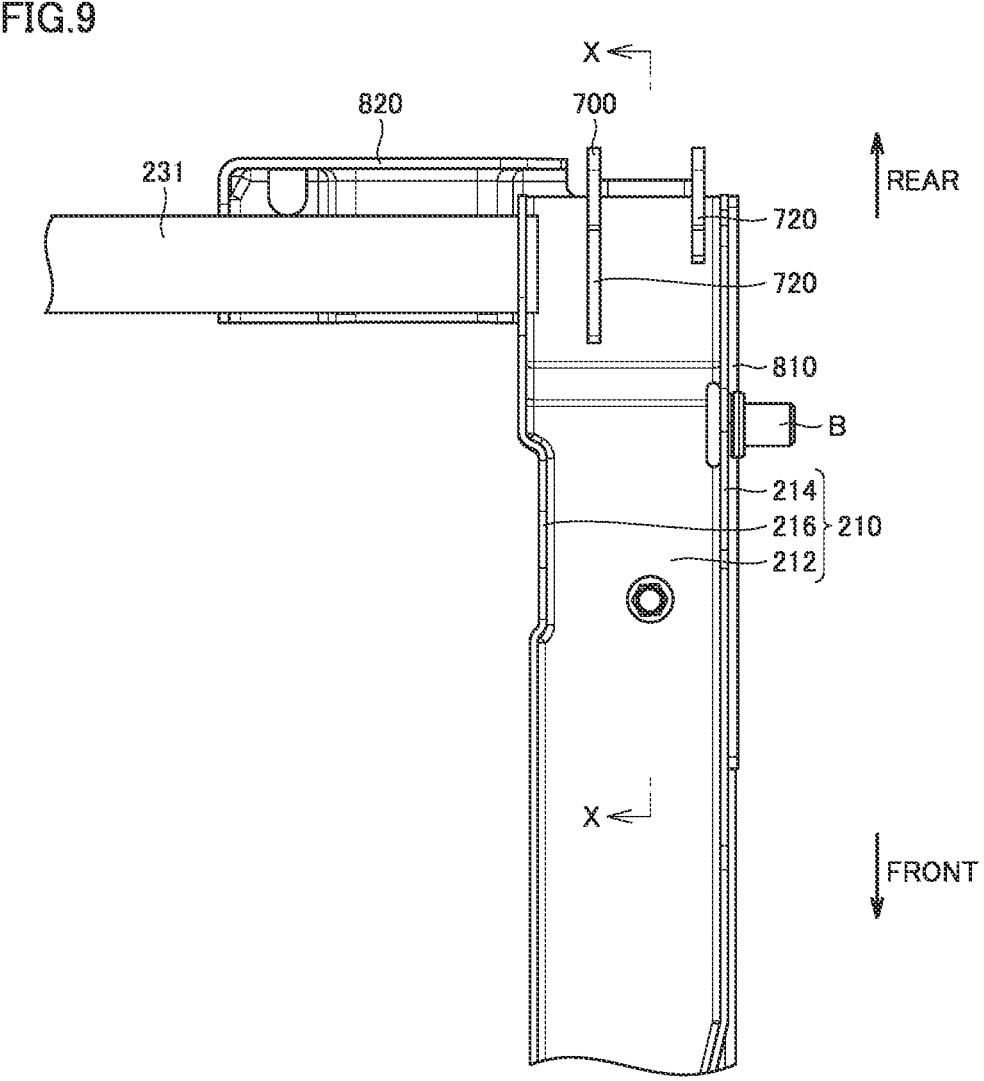
FIG. 9 is a plan view of the vicinity of a belt anchor bracket and the restriction portion.

As shown in FIGS. 8 and 10, base portion 810 includes an overlapping portion 812 that does not interfere with shaft portion 910 and projecting portion 920 when rotating plate 200 moves between the seating position and the getting-on and -off position and is located below projecting portion 920 while rotating plate 200 is located at the seating position. In the present embodiment, base portion 810 is provided with a through hole 810h large enough to allow passage of projecting portion 920 when rotating plate 200 moves between the seating position and the getting-on and -off position, and overlapping portion 812 is formed from a part of base portion 810 that surrounds through hole 810h.

As shown in FIG. 10, overlapping portion 812 is opposed, in the front-rear direction, to shaft portion 910 while rotating plate 200 is located at the seating position. Overlapping portion 812 is opposed, in the width direction, to shaft portion 910 while rotating plate 200 is located at the seating position. Overlapping portion 812 may be in contact with or slightly distant from shaft portion 910 while rotating plate 200 is located at the seating position.

In seat rotating device 10 described above, upward load inputted from the anchor of the seat belt to belt anchor bracket 210 is born by tab 720 of restriction portion 700 and born by load bearing portion 900 with fixing member 800 being interposed. Therefore, floating of rotating plate 200 from seat slider 50 is suppressed. Furthermore, since opposed portion 710 of restriction portion 700 is opposed to the rear end of belt anchor bracket 210, a position in the front-rear direction of rotating plate 200 at the seating position is effectively determined.

In the embodiment, belt anchor bracket 210 and fixing member 800 may be formed as a single member rather than members different from each other.

Second Embodiment

Seat rotating device 10 in a second embodiment of the present invention will now be described with reference to FIGS. 11 to 17. In the second embodiment, only a difference from the first embodiment will be described, and description of the structure and functions and effects the same as those in the first embodiment will not be repeated.

In the present embodiment, a structure of fixing member 800 and load bearing portion 900 is mainly different from that in the first embodiment.

In the present embodiment, fixing member 800 includes a shaft portion 830 and a projecting portion 840. Specifically, fixing member 800 is formed from a shoulder bolt.

Shaft portion 830 is in a shape extending downward from belt anchor bracket 210. Specifically, shaft portion 830 is fixed to bottom wall 212 by welding or the like. Shaft portion 830 is formed from a shaft portion of the shoulder bolt.

Projecting portion 840 is in a shape projecting from a lower end of shaft portion 830 in a direction orthogonal to shaft portion 830. Projecting portion 840 is formed in a shape of a disc annularly contiguous in a circumferential direction around shaft portion 830. Projecting portion 840 may be formed in a shape projecting from the lower end of shaft portion 830 in one direction (for example, rearward).

Load bearing portion 900 is fixed to restriction portion 700 by welding or the like. In other words, in the present embodiment, load bearing portion 900 is fixed to upper rail 52 with restriction portion 700 being interposed. As shown in FIGS. 14 to 17, load bearing portion 900 is fixed to restriction portion 700 to cover bolt B7 and nut N7.

Figure 14:
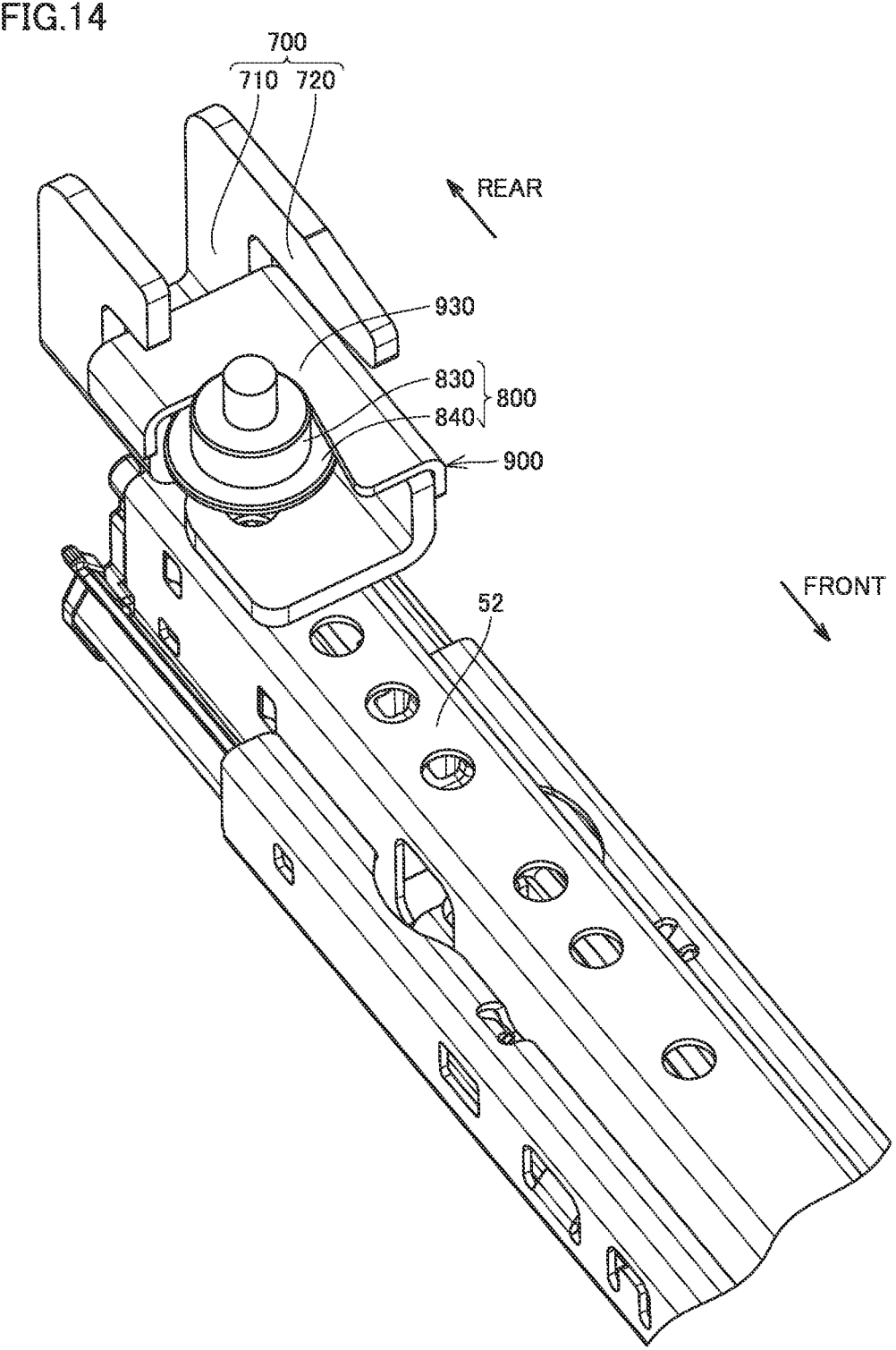
FIG. 14 is a perspective view of the vicinity of the restriction portion, the fixing member, and the load bearing portion.
Figure 17:
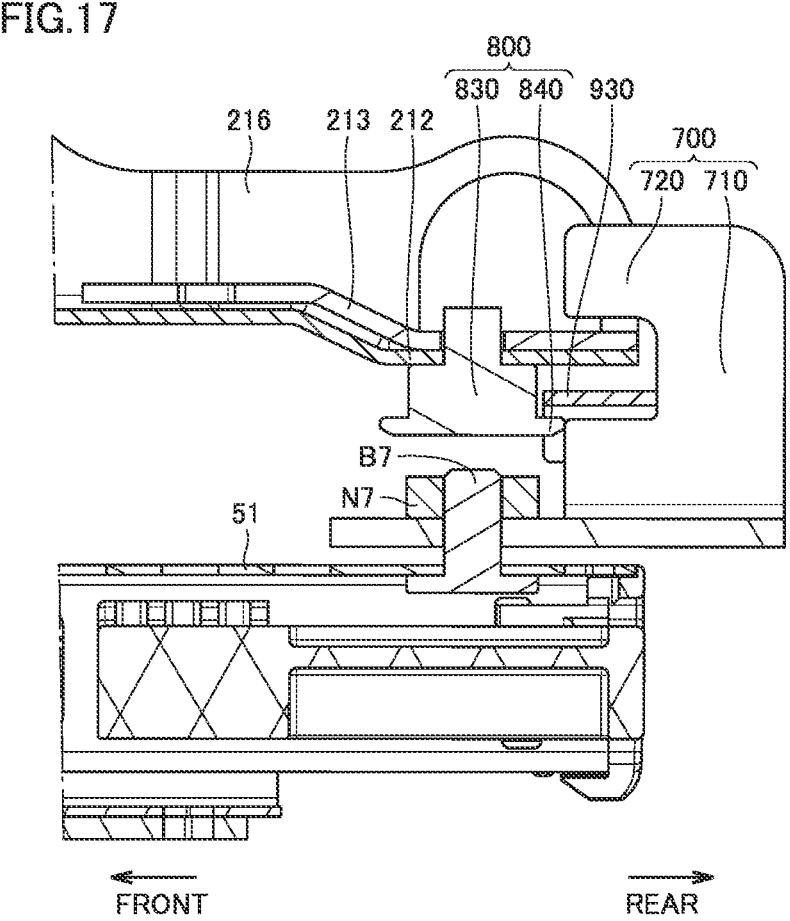
FIG. 17 is a cross-sectional view along the line XVII-XVII in FIG. 16.

Load bearing portion 900 includes an overlapping portion 930 that does not interfere with shaft portion 830 and projecting portion 840 when rotating plate 200 moves between the seating position and the getting-on and -off position and is located above projecting portion 840 while rotating plate 200 is located at the seating position. As shown in FIG. 17, overlapping portion 930 is opposed, in the front-rear direction, to shaft portion 830 while rotating plate 200 is located at the seating position. As shown in FIG. 14, overlapping portion 930 is opposed, in the width direction, to shaft portion 830 while rotating plate 200 is located at the seating position. More specifically, overlapping portion 930 is opposed, in the width direction, to an end of shaft portion 830 on the inner side in the width direction while rotating plate 200 is located at the seating position. Overlapping portion 930 may be opposed, in the width direction, also to an end of shaft portion 830 on the outer side in the width direction while rotating plate 200 is located at the seating position. Overlapping portion 930 may be in contact with or slightly distant from shaft portion 830 while rotating plate 200 is located at the seating position.

Figure 15:
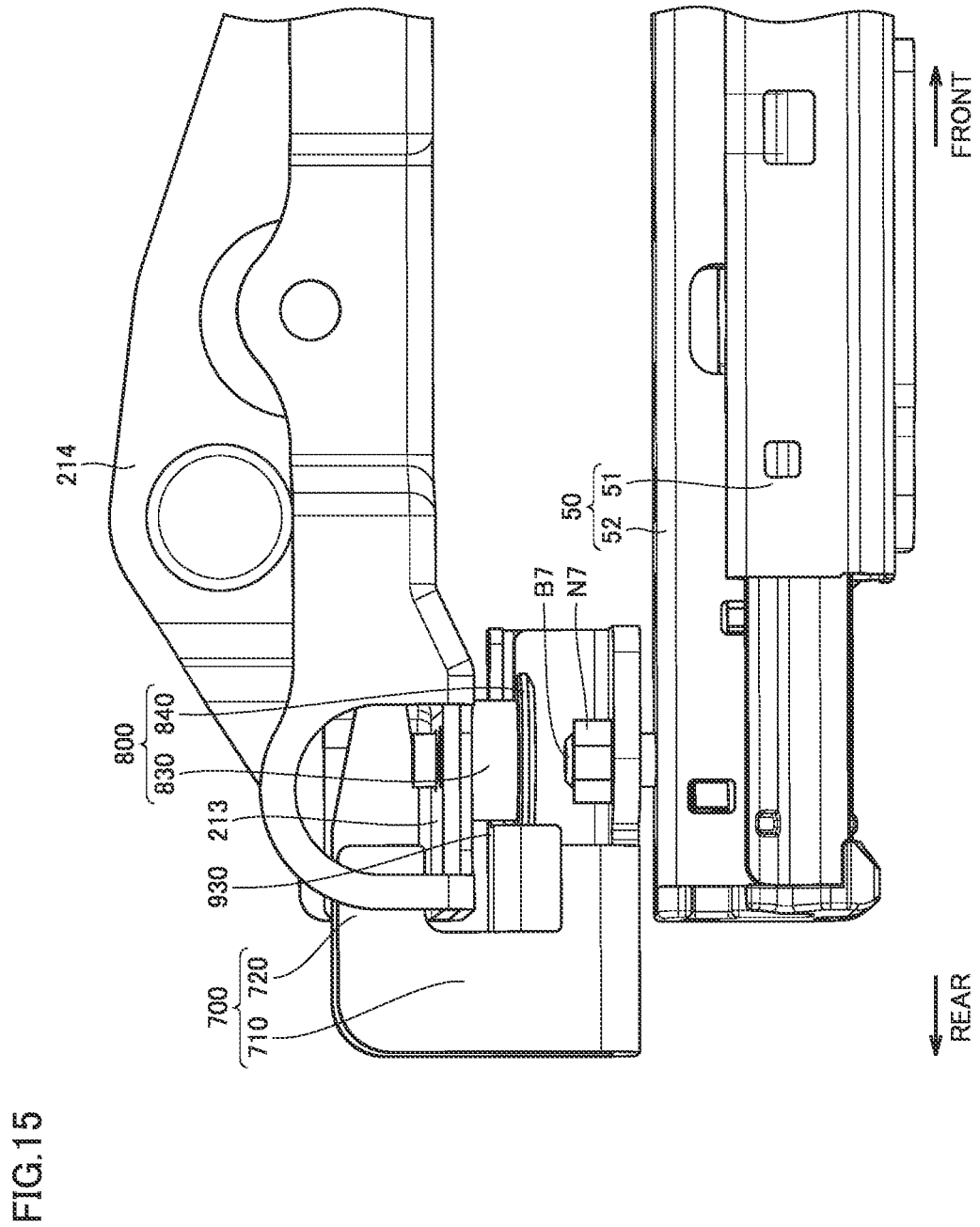
FIG. 15 is a side view of the vicinity of the restriction portion, the fixing member, and the load bearing portion.
Figure 16:
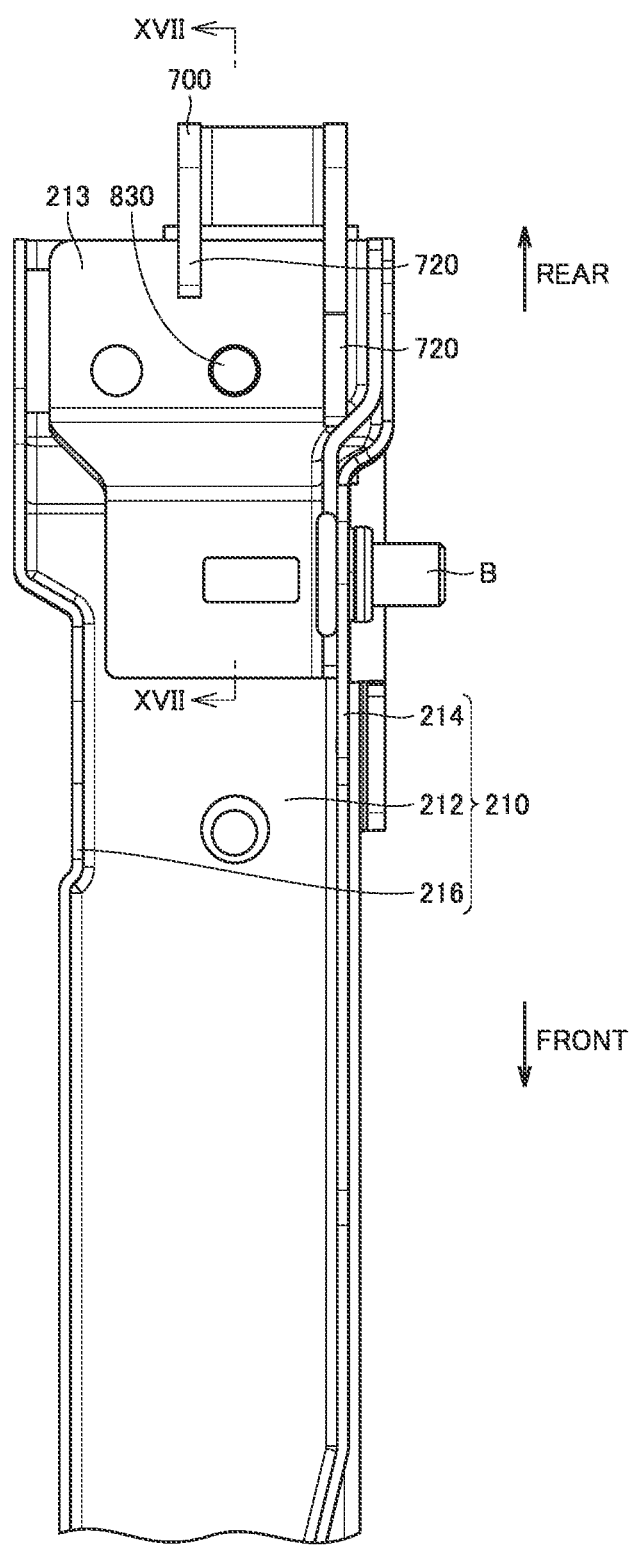
FIG. 16 is a plan view of the vicinity of the belt anchor bracket and the restriction portion.

As shown in FIGS. 15 to 17, belt anchor bracket 210 may further include a reinforcement plate 213 that reinforces bottom wall 212. Reinforcement plate 213 is fixed to the rear end of bottom wall 212 by welding or the like. Reinforcement plate 213 may be formed from a member the same as the member for bottom wall 212, rather than a member different from the member for bottom wall 212.

An illustrative embodiment described above is understood by a person skilled in the art as specific examples of aspects below.

(Aspect 1)

A seat rotating device that moves a seat body in a front-rear direction of a vehicle and rotates the seat body between a seating position where the seat body faces front of the vehicle and a getting-on and -off position where the seat body faces an opening of a door of the vehicle, the seat rotating device including: a seat slider that allows movement of the seat body in the front-rear direction, the seat slider including a lower rail fixed on a floor side and an upper rail movable along the lower rail; a base plate fixed to the upper rail; a rotating plate fixed to a lower surface of the seat body so as not to rotate relatively to the seat body, the rotating plate including a belt anchor bracket to which an anchor of a seat belt is fixed; a coupling unit that couples the base plate and the rotating plate to each other such that the rotating plate is rotatable with respect to the base plate between the seating position and the getting-on and -off position; a restriction portion fixed to the upper rail, the restriction portion restricting upward movement of the belt anchor bracket while the rotating plate is located at the seating position; a fixing member fixed to the belt anchor bracket; and a load bearing portion fixed to the upper rail, the load bearing portion bearing upward load applied to the fixing member while the rotating plate is located at the seating position. The restriction portion includes an opposed portion opposed, in the front-rear direction, to a rear end of the belt anchor bracket while the rotating plate is located at the seating position and a tab contiguous to the opposed portion, the tab being located above the rear end of the belt anchor bracket while the rotating plate is located at the seating position.

In this seat rotating device, upward load inputted from the anchor of the seat belt to the belt anchor bracket is born by the tab of the restriction portion and born by the load bearing portion with the fixing member being interposed. Therefore, floating of the rotating plate from the seat slider is suppressed. Furthermore, since the opposed portion of the restriction portion is opposed to the rear end of the belt anchor bracket, a position in the front-rear direction of the rotating plate at the seating position is effectively determined.

(Aspect 2)

In the seat rotating device described in Aspect 1, the fixing member includes a base portion arranged below the belt anchor bracket. The load bearing portion includes a shaft portion in a shape extending upward from the upper rail and a projecting portion in a shape projecting from an upper end of the shaft portion in a direction orthogonal to the shaft portion. The base portion includes an overlapping portion, the overlapping portion not interfering with the shaft portion and the projecting portion when the rotating plate moves between the seating position and the getting-on and -off position and being located below the projecting portion while the rotating plate is located at the seating position.

(Aspect 3)

In the seat rotating device described in Aspect 2, the rotating plate includes a side bracket in a shape extending in the front-rear direction, the side bracket being arranged at a position above the seat slider and opposed to the belt anchor bracket in a width direction of the vehicle, and a rear pipe that couples a rear portion of the belt anchor bracket and a rear portion of the side bracket to each other. The fixing member further includes a pipe contact portion contiguous to the base portion and being in contact with the rear pipe from below.

In this aspect, since upward load applied to the belt anchor bracket is born by both of the belt anchor bracket and the side bracket with the rear pipe being interposed, floating of the rotating plate from the seat slider is more reliably suppressed.

(Aspect 4)

In the seat rotating device described in Aspect 2 or 3, the overlapping portion is opposed to the shaft portion in a width direction while the rotating plate is located at the seating position.

In this aspect, a position in the width direction, of the rotating plate with respect to the upper rail while the rotating plate is located at the seating position is determined.

(Aspect 5)

In the seat rotating device described in Aspect 1, the fixing member includes a shaft portion in a shape extending downward from the belt anchor bracket and a projecting portion in a shape projecting from a lower end of the shaft portion in a direction orthogonal to the shaft portion, and the load bearing portion includes an overlapping portion, the overlapping portion not interfering with the shaft portion and the projecting portion when the rotating plate moves between the seating position and the getting-on and -off position and being located above the projecting portion while the rotating plate is located at the seating position.

(Aspect 6)

In the seat rotating device described in Aspect 5, the overlapping portion is opposed to the shaft portion in a width direction while the rotating plate is located at the seating position.

In this aspect, a position in the width direction, of the rotating plate with respect to the upper rail while the rotating plate is located at the seating position is determined.

Though embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A seat rotating device that moves a seat body in a front-rear direction of a vehicle and rotates the seat body between a seating position where the seat body faces front of the vehicle and a getting-on and off position where the seat body faces an opening of a door of the vehicle, the seat rotating device comprising:
    a seat slider that allows movement of the seat body in the front-rear direction, the seat slider including a lower rail fixed on a floor side and an upper rail movable along the lower rail;
    a base plate fixed to the upper rail;
    a rotating plate fixable to a lower surface of the seat body so as not to rotate relatively to the seat body, the rotating plate including a belt anchor bracket to which an anchor of a seat belt is fixable;
    a coupling unit that couples the base plate and the rotating plate to each other such that the rotating plate is rotatable with respect to the base plate between the seating position and the getting-on and off position;
    a restriction portion fixed to the upper rail, the restriction portion restricting upward movement of the belt anchor bracket while the rotating plate is located at the seating position;
    a fixing member fixed to the belt anchor bracket; and
    a load bearing portion fixed to the upper rail, the load bearing portion bearing upward load applied to the fixing member while the rotating plate is located at the seating position, wherein
    the restriction portion includes
        an opposed portion opposed, in the front-rear direction, to a rear end of the belt anchor bracket while the rotating plate is located at the seating position, and
        a tab contiguous to the opposed portion, the tab being located above the rear end of the belt anchor bracket while the rotating plate is located at the seating position.

2. The seat rotating device according to claim 1, wherein
    the fixing member includes a base portion arranged below the belt anchor bracket,
    the load bearing portion includes
        a shaft portion in a shape extending upward from the upper rail, and
        a projecting portion in a shape projecting from an upper end of the shaft portion in a direction orthogonal to the shaft portion, and
    the base portion includes an overlapping portion, the overlapping portion not interfering with the shaft portion and the projecting portion when the rotating plate moves between the seating position and the getting-on and off position and being located below the projecting portion while the rotating plate is located at the seating position.

3. The seat rotating device according to claim 2, wherein the rotating plate includes
   a side bracket in a shape extending in the front-rear direction, the side bracket being arranged at a position above the seat slider and opposed to the belt anchor bracket in a width direction of the vehicle, and
   a rear pipe that couples a rear portion of the belt anchor bracket and a rear portion of the side bracket to each other, and
   the fixing member further includes a pipe contact portion contiguous to the base portion and being in contact with the rear pipe from below.

4. The seat rotating device according to claim 2, wherein the overlapping portion is opposed to the shaft portion in a width direction while the rotating plate is located at the seating position.

5. The seat rotating device according to claim 1, wherein the fixing member includes
   a shaft portion in a shape extending downward from the belt anchor bracket, and
   a projecting portion in a shape projecting from a lower end of the shaft portion in a direction orthogonal to the shaft portion, and
   the load bearing portion includes an overlapping portion, the overlapping portion not interfering with the shaft portion and the projecting portion when the rotating plate moves between the seating position and the getting-on and off position and being located above the projecting portion while the rotating plate is located at the seating position.

6. The seat rotating device according to claim 5, wherein the overlapping portion is opposed to the shaft portion in a width direction while the rotating plate is located at the seating position.

* * * * *